United States Patent [19]

Moriya

[11] Patent Number: 5,784,495
[45] Date of Patent: Jul. 21, 1998

[54] IMAGE PROCESSING DEVICE FOR PRODUCING A VARIABLE PERIOD PULSE-WIDTH MODULATED BINARY IMAGE SIGNAL

[75] Inventor: Hideki Moriya, Kanagawa, Japan

[73] Assignee: Fuji Xerox Co., Ltd., Tokyo, Japan

[21] Appl. No.: 496,667

[22] Filed: Jun. 29, 1995

[30] Foreign Application Priority Data

Jun. 30, 1994 [JP] Japan ................... 6-150221

[51] Int. Cl.$^6$ .................. H04N 1/40; G06K 9/46
[52] U.S. Cl. .................. 382/237; 358/456; 358/462
[58] Field of Search .................. 341/157; 358/462, 358/298, 455, 456; 327/63, 68, 72, 99, 113; 382/237

[56] References Cited

U.S. PATENT DOCUMENTS

| | | | |
|---|---|---|---|
| 4,138,654 | 2/1979 | Luhowy | 334/55 |
| 4,786,863 | 11/1988 | Milkovic | 324/142 |
| 4,819,066 | 4/1989 | Miyagi | 358/456 |
| 5,148,287 | 9/1992 | Kemmochi et al. | 358/298 |
| 5,495,278 | 2/1996 | Oda et al. | 347/252 |
| 5,495,341 | 2/1996 | Kawana et al. | 358/298 |

FOREIGN PATENT DOCUMENTS

| | | |
|---|---|---|
| 62-49781 | 3/1987 | Japan . |
| 62-181564 | 8/1987 | Japan . |
| 62-189879 | 8/1987 | Japan . |

*Primary Examiner*—Edward L. Coles, Sr.
*Assistant Examiner*—Kimberly A. Williams
*Attorney, Agent, or Firm*—Finnegan, Henderson, Farabow, Garrett & Dunner, L.L.P.

[57] ABSTRACT

A period determination signal is generated in accordance with the image type of an input image signal. A clock signal having one of a plurality of periods is generated in accordance with the period determination signal. A CR integration circuit having a resistor and at least one capacitor generates a triangular-wave signal based on the clock signal. The combined capacitance of the CR integration circuit is changed in accordance with the period determination signal. A pulse-width modulated binary image signal is produced by comparing the triangular-wave signal with the input image signal. The amplitude of the triangular signal is kept constant by changing the combined capacitance of the CR integration circuit in proportion to the period of the clock signal.

4 Claims, 3 Drawing Sheets

IMAGE PROCESSING DEVICE FOR PRODUCING A VARIABLE PERIOD PULSE-WIDTH MODULATED BINARY IMAGE SIGNAL

BACKGROUND OF THE INVENTION

The present invention relates to an image processing device used in an image forming apparatus such as an electrophotographic copier or a printer and, more specifically, to an image processing device used in an image forming apparatus that forms halftone images by performing pulse width modulation on laser light.

For example, in an image forming apparatus such as an electrophotographic copier or a printer using a laser, an electrostatic latent image is formed by applying laser light to the surface of a uniformly charged photoreceptor and a visual image is obtained by developing the latent image with toner or the like. Basically, a resulting output image is a binary image because the laser is generally on/off-controlled.

In the image forming apparatus using the on/off-controlled laser, a halftone image is reproduced by expressing an image by dots and changing the black-white ratio of the dots. A signal for producing the dots is generated by pulse width modulation that is performed by a comparison circuit based on an input image signal and a triangular-wave signal having a prescribed period.

FIG. 4 shows a configuration of a conventional image processing device used in an image forming apparatus that reproduces halftone images by performing pulse width modulation on laser light. An image signal that has been input to an image signal input section 51 is supplied to an image characteristic judging section 52, which judges the image characteristic of the input image. A judgment output of the image characteristic judging section 52 is supplied to a period determination signal generating section 53, which generates a period determination signal to be used for determining a period suitable for each image characteristic. As described later, a period suitable for each image characteristic is selected in accordance with the period determination signal. On the other hand, the image signal that has been input to the image signal input section 51 is supplied to a D/A converting section 56, where it is converted to an analog image signal in synchronism with a pixel clock signal.

To produce high-quality images for respective image types by using the conventional device of FIG. 4, a plurality of reference signals suitable for respective image characteristics need to be generated. More specifically, to produce such an image as a character image that requires black and white levels to be reproduced definitely, it is necessary to use a triangular-wave signal having a short period. In contrast, to produce such an image as a picture image that requires halftone reproduction, a triangular-wave signal having a long period is needed.

In the example of FIG. 4, the clock signal generating section 54 generates three kinds of clock signals having different periods. The three kinds of clock signals are respectively integrated by CR integration circuits 55a–55c having different time constants, to produce three kinds of reference signals (triangular-wave signals). The triangular-wave signals are compared, i.e., pulse-width modulated, with an analog image signal that is supplied from the D/A converting section 56 in voltage comparators 57a–57c, respectively. By selecting one of the outputs of the voltage comparators 57a–57c by a selection circuit 58, a pulse-width modulated output signal is obtained.

However, to generate triangular-wave signals of a plurality of periods, the above conventional device uses a plurality of triangular-wave generators, a plurality of voltage comparators, etc. Therefore, the circuit configuration is complex, so that the device is liable to cause image noise due to crosstalk between the plurality of analog circuits.

Japanese Unexamined Patent Publication No. Sho. 62-49781 discloses a technique of generating a triangular-wave signal having a desired period. In a triangular-wave generating circuit of this technique, triangular-wave signals of a plurality of periods are generated by switching among resistors of a CR integration circuit by use of an analog switch. In the case of generating triangular-wave signals of a plurality of periods by switching among time constants of the CR integration circuit, there do not occur the problems that are associated with the case of using a plurality of triangular-wave generators and voltage comparators. However, as described below, the former case has a problem that due to reduced operation speed, control cannot be performed on a pixel-by-pixel basis.

In the device disclosed in the publication Sho. 62-49781, since the analog switch allows bi-directional current flow, bi-directional elements such as FETs need to be used as the switching elements. However, the switching speed of bi-directional elements is slower than bipolar transistors and diodes, they cannot switch among triangular-wave signals on a pixel-by-pixel basis.

SUMMARY OF THE INVENTION

In view of the above, an object of the present invention is to provide an image processing device having a triangular-wave generator that can generate triangular-wave signals of a plurality of periods with a simple configuration and can switch among those triangular-wave signals at high speed on a pixel-by-pixel basis.

According to the invention, there is provided an image processing device comprising:

means for generating a clock signal having one of a plurality of periods in accordance with a period determination signal relating to a period of a reference signal;

a CR integration circuit including a resistor and at least one capacitor, for generating the reference signal based on the clock signal;

means for changing a combined capacitance of the CR integration circuit in accordance with the period determination signal; and means for producing a pulse-width modulated binary image signal by comparing the reference signal with an input image signal.

Stated more specifically, the clock signal of a selected period generated by the clock signal generating means is supplied to the CR integration circuit, where a triangular-wave signal for pulse-width modulation is generated such that the capacitor is repeatedly charged and discharged in synchronism with the clock signal. A pulse-width modulated binary signal is produced by comparing the triangular signal, i.e., the reference signal having the selected period, with the input image signal. The period of the reference signal is changed in accordance with the period determination signal. In link with this change, the combined capacitance of the CR integration circuit is changed by on/off-controlling the switching elements connected to the respective capacitors. More specifically, the time constant of the CR integration circuit is increased as the period of the reference signal becomes longer, and vice versa. Thus, there can be generated triangular-wave signals having the same amplitude but different periods.

DESCRIPTION OF THE PREFERRED EMBODIMENTS

Figure 1:
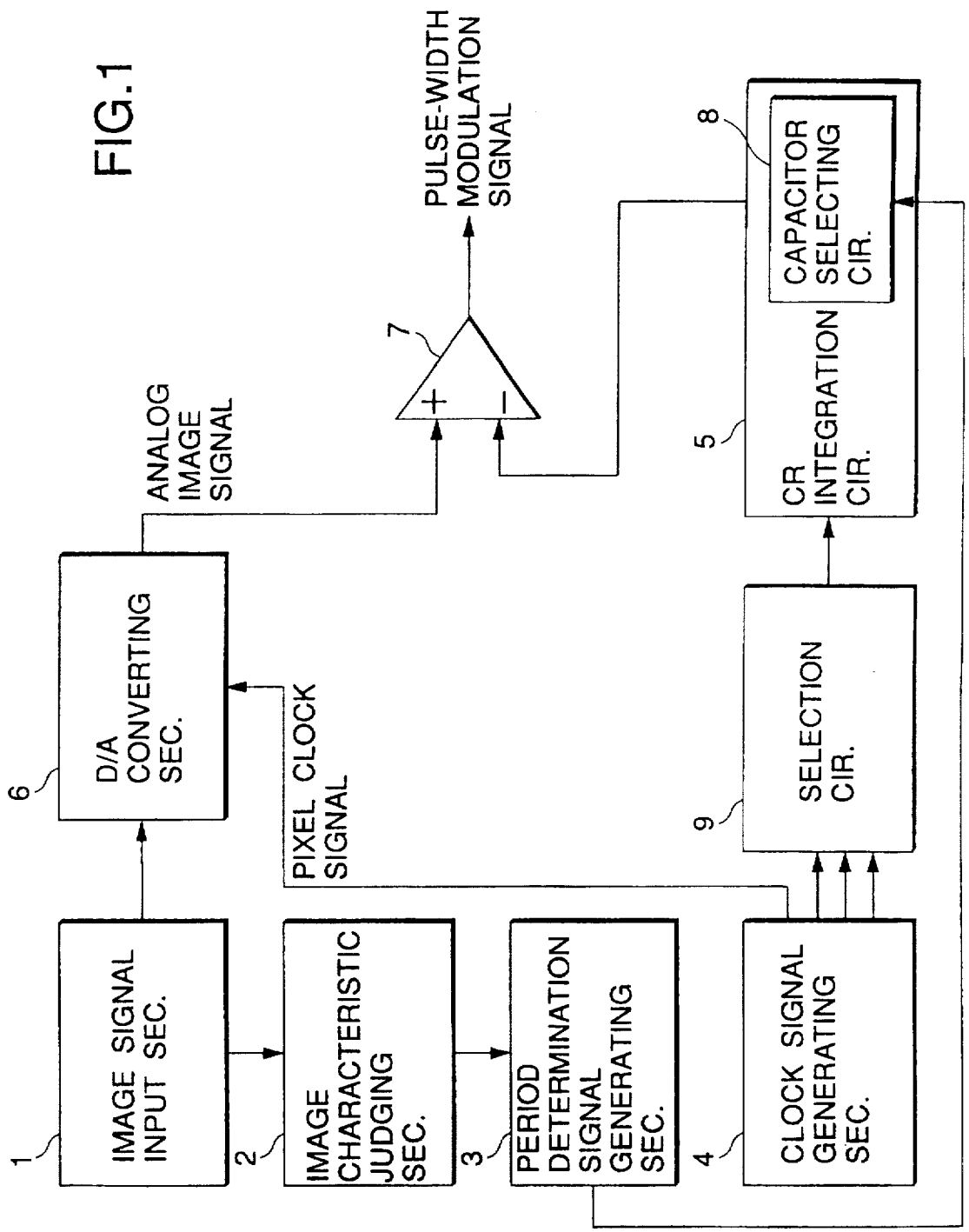
FIG. 1 is a block diagram showing an image processing device according to an embodiment of the present invention.

FIG. 1 is a block diagram showing an image processing device according to an embodiment of the present invention.

An input image signal that has been input to an image signal input section 1 is supplied to an image characteristic judging section 2, which judges the image characteristic of the input image. In this example, discrimination is made among three types of images, i.e., a text image, a picture image, and a text/picture mixture image. A judgment output of the image characteristic judging section 2 is supplied to a period determination signal generating section 3, which generates two kinds of period determination signals a and b to be used for determining a period suitable for the image characteristic. On the other hand, the input image signal that has been input to the image signal input section 1 is supplied to a D/A converting section 6, where it is converted to an analog image signal in synchronism with a pixel clock signal.

The clock signal generating section 4 generates a pixel clock signal and three kinds of clock signals of different periods to be used for forming dots of prescribed pitches. Based on the period determination signals a and b sent from the period determination signal generating section 3, a selection circuit 9 selects and outputs one of the three kinds of clock signals which corresponds to the image characteristic. A CR integration circuit 5 generates a reference signal (triangular-wave signal), which is compared with the analog image signal sent from the D/A converting section 6 in a voltage comparator 7 to produce a pulse width modulation signal. The CR integration circuit 5 has a capacitor selecting circuit 8 for selecting a capacitor or capacitors, i.e., combined capacitance.

Figure 2:
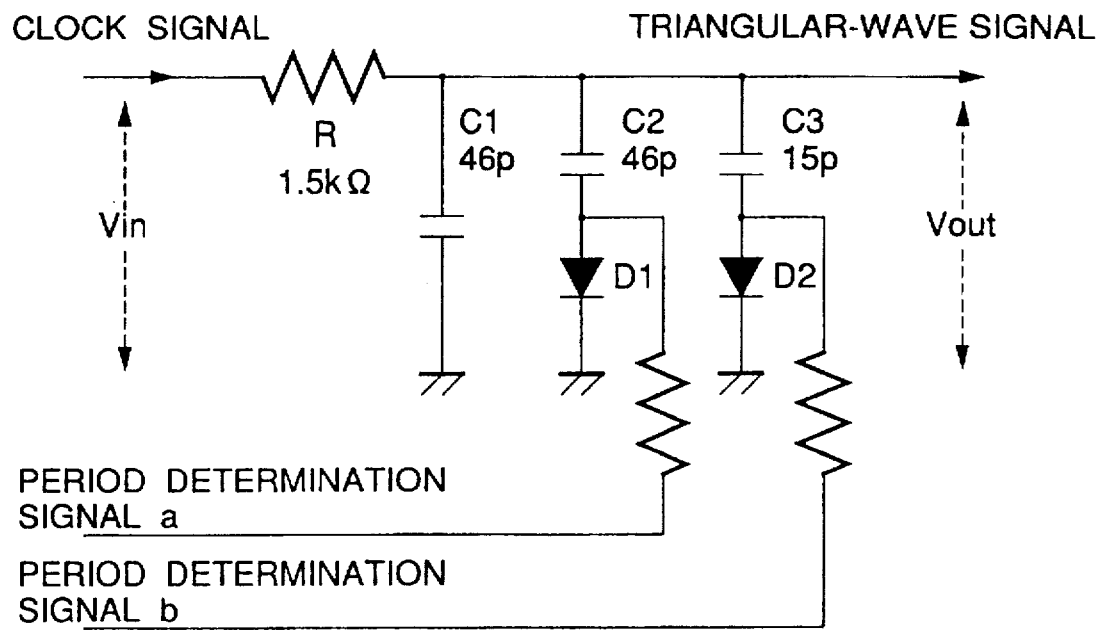
FIG. 2 is a circuit diagram showing a CR integration circuit using diodes as switching elements.

FIG. 2 is a circuit diagram showing a configuration of the CR integration circuit 5. A clock signal is applied to one terminal of a resistor R, and the other terminal of the resistor R is grounded via a first capacitor C1. A series circuit of a second capacitor C2 and a first diode D1 and another series circuit of a third capacitor C3 and a second diode D2 are connected in parallel to the first capacitor C1. The first and second diodes D1 and D2 constitute the capacitor selecting circuit 8. The period determination signal a is applied to the connecting point of the second capacitor C2 and the first diode D1, and the period determination signal b is applied to the connecting point of the third capacitor C3 and the second diode D2. The triangular-wave signal is output at the connecting point of the resistor R and the first capacitor C1. In the embodiment of FIG. 2, the resistor R has a resistance of 1.5 kΩ, and the first to third capacitors have capacitances of 46 pF, 46 pF and 15 pF.

This embodiment addresses three kinds of image characteristics, and the reference signals corresponding to the respective image characteristics have frequencies of 18 MHz, 13.5 MHz and 9 MHz, for instance. Each of the period determination signals a and b is switched between the levels of 0 V and 5 V. An output voltage Vout of the CR integration circuit 5 is expressed as $$Vout = (1 - e^{-\frac{t}{RC}})Vin$$

where Vin is an input voltage, C and R are capacitance and resistance components of the CR integration circuit 5, and t is time. Therefore, if the combined capacitance is so changed that t/C is kept the same, reference signals having the same amplitude are obtained. For example, when the clock signal of 18 MHz is input, both period determination signals a and b are set at 0 V. In this case, the switching diodes D1 and D2 are made off, so that the combined capacitance of the CR integration circuit 5 becomes C1, i.e., 46 pF. When the clock signal of 9 MHz is input, the period determination signals a and b are set at 5 V and 0 V, respectively. In this case, the diode D1 is made on while the diode D2 is made off, so that the combined capacitance of the CR integration circuit 5 becomes C1 +C2, i.e., 92 pF. Since t/C is the same as in the case of the 18-MHz clock signal, the amplitude of the reference signal is also the same. Similarly, when the clock signal of 13.5 MHz is input, the period determination signals a and b are set at 0 V and 5 V, respectively. In this case, the diode D1 is made off while the diode D2 is made on, so that the combined capacitance of the CR integration circuit 5 becomes C1 +C3, i.e., 61 pF. Thus, the amplitude of the reference signal is kept the same.

Figure 3:
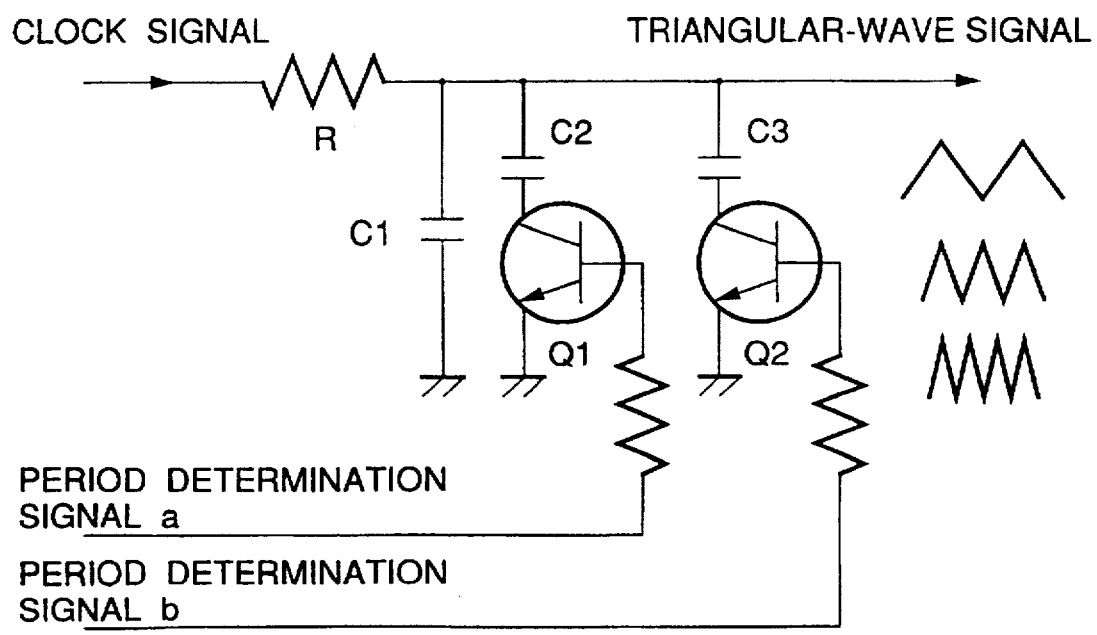
FIG. 3 is a circuit diagram showing a CR integration circuit using transistors as switching elements.
Figure 4:
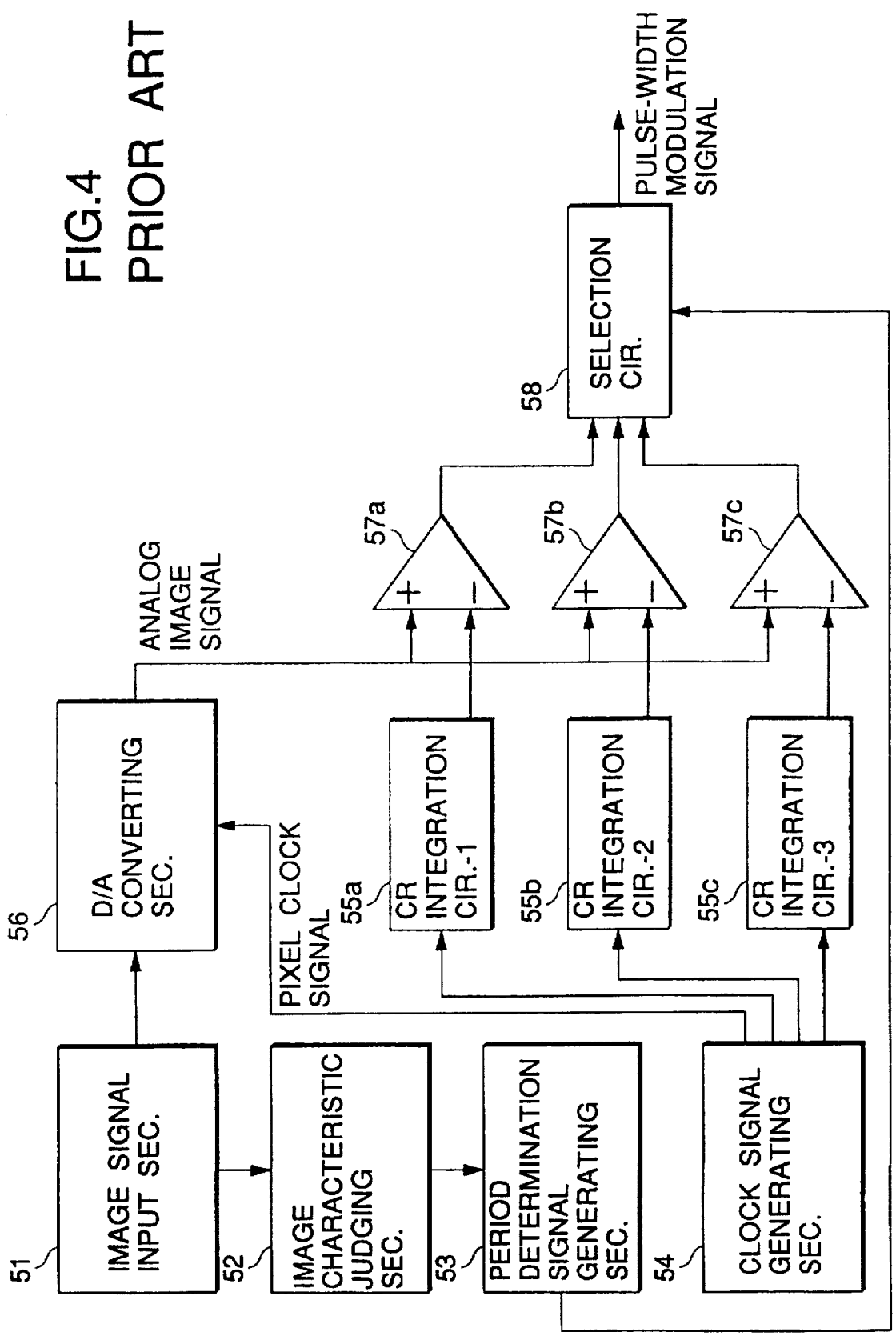
FIG. 4 is a block diagram showing a conventional image processing device.

While the diodes are used as the electronic switching elements in the above embodiment, they may be replaced by transistors Q1 and Q2 as shown in FIG. 3. Elements other than diodes and transistors may also be used as long as they can open and close the circuits in the above manner.

Since the switching elements operate sufficiently faster compared with the pixel period, the switching among the triangular-wave signals can be performed on a pixel-by-pixel basis. Even if triangular-wave signals are switched in one scanning period for mixed text and picture images, since the switching is performed continuously, optimum pulse-width modulation can be performed for each type of image. Since the signal of only one frequency goes through the analog circuitry, crosstalk can be avoided to enable production of high-quality images. Further, the device can be constructed at a low cost.

Although in the above embodiments the clock signals having different periods are generated by the clock signal generating section, there may be used a variable-period type clock signal generator in which the clock period is varied in accordance with a period determination signal.

As described above, according to the invention, in an electrophotographic digital copier, a printer, and like apparatuses, a plurality of reference signals to be used for generating triangular-wave signals of different periods can be generated with a simple configuration. Further, the switching among the reference signals can be performed at high speed on a pixel-by-pixel basis in accordance with the image characteristic of an input image.

What is claimed is:

1. An image processing device comprising:

means for generating a plurality of clock signals, each signal having one of a plurality of periods;

selection circuit for selecting one of the plurality of clock signals in accordance with a period determination signal relating to an input image signal;

an integration circuit, including a resistor and a plurality of capacitors, for generating a reference signal based on the selected clock signal;

means for changing a period of the reference signal by changing a combined capacitance of the integration circuit in accordance with the period determination signal; and means for producing a pulse-width modulated binary image signal by comparing the reference signal with the input image signal.

2. The image processing means of claim 1, further comprising means for generating the period determination signal based on an image type of the input image signal.

3. The image processing device of claim 1, wherein the reference signal is a triangular-wave signal.

4. The image processing device of claim 1, wherein the combined capacitance changing means changes the combined capacitance in proportion to the period of the clock signal.

* * * * *